United States Patent
Gebre-Giorgis et al.

[11] Patent Number: 5,997,244
[45] Date of Patent: Dec. 7, 1999

[54] COOLING AIRFLOW VORTEX SPOILER

[75] Inventors: Yoseph Gebre-Giorgis; Mark C. Johnson; Michael J. Kolodziej, all of Phoenix; Daniel M. Voron; Bruce D. Wilson, both of Gilbert, all of Ariz.

[73] Assignee: AlliedSignal Inc., Morris Township, N.J.

[21] Appl. No.: 09/032,618

[22] Filed: Feb. 27, 1998

Related U.S. Application Data

[60] Provisional application No. 60/039,498, May 16, 1979.

[51] Int. Cl.$^6$ .................................................... F01D 5/08
[52] U.S. Cl. .......................................... 415/115; 415/175
[58] Field of Search .................................... 415/115, 116, 415/175, 176

[56] References Cited

U.S. PATENT DOCUMENTS

| | | |
|---|---|---|
| 2,618,433 | 11/1952 | Loos . |
| 4,236,869 | 12/1980 | Laurello . |
| 4,296,599 | 10/1981 | Adamson ............................ 415/115 X |
| 4,416,111 | 11/1983 | Lenahan et al. ..................... 415/115 X |
| 4,541,774 | 9/1985 | Rieck et al. ............................. 415/115 |
| 4,595,339 | 6/1986 | Naudet . |
| 4,674,955 | 6/1987 | Howe et al. .............................. 416/95 |
| 4,719,747 | 1/1988 | Willkop et al. ..................... 415/115 X |
| 4,759,688 | 7/1988 | Wright et al. ............................. 416/95 |
| 4,822,244 | 4/1989 | Maier et al. . |
| 4,825,643 | 5/1989 | Hennecke et al. .................. 415/115 X |
| 4,882,902 | 11/1989 | Reigel et al ........................ 415/115 X |
| 4,920,741 | 5/1990 | Liebl ................................... 415/115 X |
| 5,232,335 | 8/1993 | Narayana et al. ...................... 415/115 |
| 5,271,711 | 12/1993 | McGreehan et al. . |
| 5,555,721 | 9/1996 | Bourneuf et al. ................... 415/115 X |
| 5,695,319 | 12/1997 | Matsumoto et al. ...................... 416/95 |

FOREIGN PATENT DOCUMENTS

| | | | |
|---|---|---|---|
| 4214753 | 11/1993 | Germany ............................... 415/115 |
| 1355769 | 11/1987 | Russian Federation ............... 415/115 |
| 712051 | 7/1954 | United Kingdom . |

*Primary Examiner*—John Ryznic
*Attorney, Agent, or Firm*—Robert Desmond, Esq.

[57] ABSTRACT

A gas turbine engine cooling airflow pickup and delivery system which radially inwardly traverses the torque transmittal path of the compressor section at a relatively large radius location, then extends substantially farther inwardly to a significantly smaller radius location, all with minimal static pressure loss to the cooling airflow. Pressurized, substantially non-swirling air from the compressor stage is supplied to a collector, and from the collector thru pickup holes arranged at an angle of 45 degrees reversely to the direction of rotation of the shaft. The pressurized air is then lead into a vortex spoiler which has a plurality of blades smoothly curved reversely to the direction of rotation of the shaft, the radially outer end of each blade being inclined in matching relation to the pickup holes.

15 Claims, 3 Drawing Sheets

COOLING AIRFLOW VORTEX SPOILER

CROSS REFERENCE TO RELATED APPLICATION

Priority is claimed to provisional application Serial No. 60/039,498, filed May 16, 1979 now abandoned.

BACKGROUND OF THE INVENTION

1. Field of the Invention

This invention pertains to gas turbine engines and pertains more particularly to improvements in pickup and delivery of cooling airflow with minimum static pressure loss therein.

2. Description of the Prior Art

High performance gas turbine engines utilize a high speed compressor section to deliver pressurized airflow to the engine combustor. High energy exhaust gases from the combustor drive one or more high temperature turbines, which, in turn provide the motive power for the compressor section. It is conventional to use a small portion of pressurized air from the compressor section for cooling of internal hot section components of the engine as well for seal buffering. This parasitic cooling flow, sometimes referred to as a secondary bleed airflow, represents a parasitic power loss of the engine, and it is therefore important that such cooling flow be minimized. Thus, this cooling flow should not be subject to undue pressure losses nor unnecessary heating.

The flow path for this cooling flow in many instances must radially inwardly traverse the rotating shafting arrangement which is driving the compressor in order to reach a radially inner location for subsequent delivery in axial directions to components to be cooled or seals to be buffered. In certain gas turbine engine designs it is highly desirable or even a requirement that the shafting arrangement which is transmitting torque to drive the compressor stage be at a location which has a much larger radius than the smaller radius to which the cooling airflow needs to be delivered. In passing to such a smaller radius the cooling airflow will naturally experience an increase in tangential velocity, introducing a vortex action into the cooling airflow. This introduces significant pressure drop to the cooling airflow as it passes to the smaller radius.

Loos U.S. Pat. No. 2,618,433 represents a bleed airflow arrangement suitable only to much older gas turbine engine technology which was constrained, as mentioned in the Loos patent, by the lack of incorporation of a diffuser in the compressor section. This problem has been overcome in newer gas turbine engines. As a result, Loos teaches inclusion of bleed air passageways opening directly into the compressor stages immediately down stream of a set of compressor blades such that highly swirled, vortically spinning air is bled from the compressor. Loos then teaches utilization of a blading structure in order to recover work from the swirling flow to assist in driving the compressor section.

Rieck U.S. Pat. No. 4,541,774 represents a more modem gas turbine engine and cooling airflow pickup system. The arrangement illustrated in the Rieck patent is of the type wherein the shafting 24 and torque transmittal path for the compressor section is very nearly at the same radius as the internal radius to which the cooling airflow must be delivered—as represented by the small radial difference between holes 32 and space 18 after the rotor 22. Thus, after radially inwardly traversing shaft 24 the cooling airflow is already essentially at its required radial location and thus not subject to further increase in vortex spinning thereof due to movement to a much smaller radial location. The Rieck reference also represents a certain form of tangential onboard injection systems (TOBI) of many gas turbine. Specifically, like other TOBI systems, the Rieck reference utilizes a set of stationary turning vanes 34 which deliberately induces rotational vortex flow into the cooling airflow at the expense of reduced pressure of the cooling airflow.

SUMMARY OF THE INVENTION

It is an object of the present invention to provide an improved cooling airflow pickup and delivery system which minimizes pressure loss in the cooling airflow while directing it radially inwardly a substantial distance to a significantly smaller radius. This is particularly applicable for gas turbine engines wherein the torque transmitting path of the shafting for the compressor section is at a substantially larger radius than the radius of the location to where the cooling airflow must be delivered.

Briefly, the present invention includes a collection chamber for collecting the pressurized, cooling airflow from the compressor section in a substantially non-swirling, diffused state. The cooling airflow then directly radially inwardly traverses the torque transmitting path for the compressor section through an array of radially inward straight holes which are inclined at a preselected angle in opposition to, or reversely from, the direction of rotation of the shaft and compressor. This array of pickup holes is, of course, rotating with the shaft. The cooling airflow, having traversed the torque transmitting path with minimal loss of static pressure head, then enters a radially inwardly extending vortex spoiler firmly intersecured with and rotating with the shafting. The vortex spoiler includes an array of circumferientially spaced blades that are smoothly curved in opposition, to or reversely to, the direction of rotation of the shafting. The radial outer end of each of the blades is inclined in that matching relation to the angle of inclination of the pickup holes, while the radial inner end of each of the blades are in a substantially purely radial direction. This arrangement of the vortex spoiler permits the cooling airflow to traverse radially inwardly therethrough without any significant increase in the vortex flow thereof. Accordingly, the cooling airflow exits the radial inner end of the vortex spoiler at the desired smaller radius location with minimal swirl increase and therefore minimal static pressure loss therein.

These and other objects and advantages of the present invention are specifically set forth in or will become apparent from the following detailed description of the invention when read in conjunction with the accompanying drawings.

DETAILED DESCRIPTION OF THE INVENTION

Figure 1:
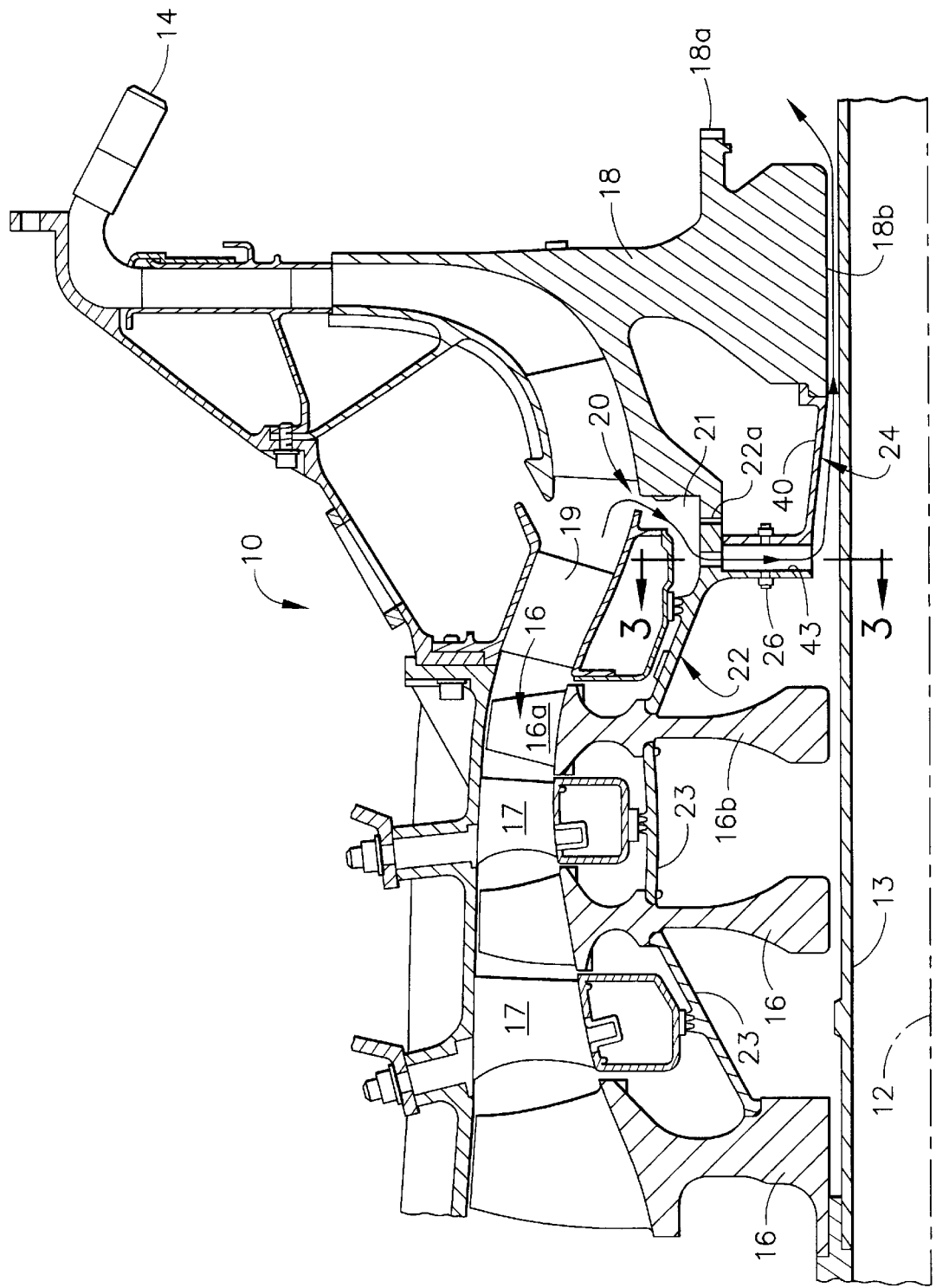
FIG. 1 is a partial plan cross section of the compressor portion of a gas turbine engine incorporating the present invention.

Referring more particularly to the drawings, a gas turbine engine includes a compressor section generally denoted by the numeral 10, disposed radially outwardly of the central shaft 13, both of which rotate about axis depicted at 12. Compressor section 10 is illustrated with three axial compressor stages 16 and a final centrifugal compressor 18. Stationary vane sets 17 cross the airflow path between sets of compressor stages 16, and a final set of stationary vanes 19 acts as a diffuser arrangement for deswirling and diffusing the pressurized airflow just prior to its entry to the centrifugal compressor 18. In the arrangement illustrated each of the compressor stages 16 is constructed in the form in what is commonly referred to as a "blisk" compressor wherein a plurality of radially outer compressor blades 16a are integrally formed with a central hub section 16b of the compressor stage. For proper mechanical integrity of such a compressor blisk it is often necessary that the torque transmitting path for driving the compressor be disposed at a substantially large radius. Further, the engine dynamics often also require the torque transmitting path to be at a large radius position. It the arrangement illustrated axially extending elements 22 and 23 represent the torque transmitting shafting between the three axial compressor stages 16 and the centrifugal compressor stage 18. The aft end 22a of element 22 is drivingly coupled with the mating end of centrifugal compressor 18 in a conventional curving coupling arrangement. The torque transmitting path extends aft from centrifugal compressor 18 through a curvic coupling end 18a to the driving turbine section of the engine (not shown).

In conventional operation of the engine, driving torque is transmitted from the turbine section (not shown) to the compressor section 10 via the torque transmitting path 22, 23 just described. Each compressor stage serially compresses the airflow for subsequent exit at 14 to be delivered to the combustor (not shown) of the gas turbine engine.

Just down stream of diffuser 19 and its associated stationary structure is a radially inner opening 20 through which diffused, pressurized cooling airflow enters a collector defining a chamber 21 in a substantially non-swirling condition. The present invention comprises an improved cooling airflow pickup and delivery system for directing the non-swirling, pressurized airflow in collector chamber 21 to a much smaller radial location substantially adjacent shaft 13 for subsequent axial delivery such as inside the centrifugal compressor central core 18b for delivery to required stations within the gas turbine engine.

Figure 2:
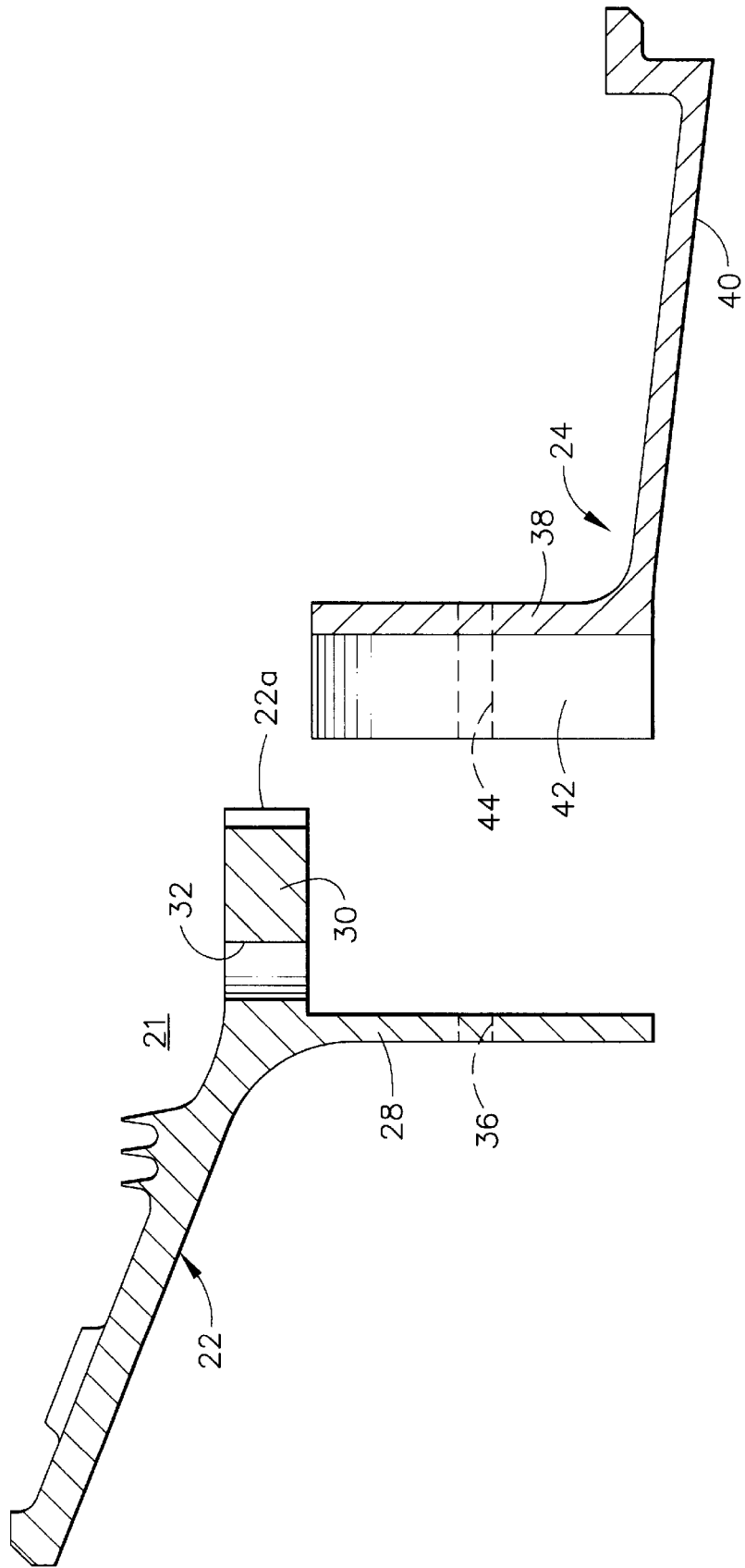
FIG. 2 is an enlarged, exploded, plan cross section of the cooling airflow pickup and delivery system of the present invention.
Figure 3:
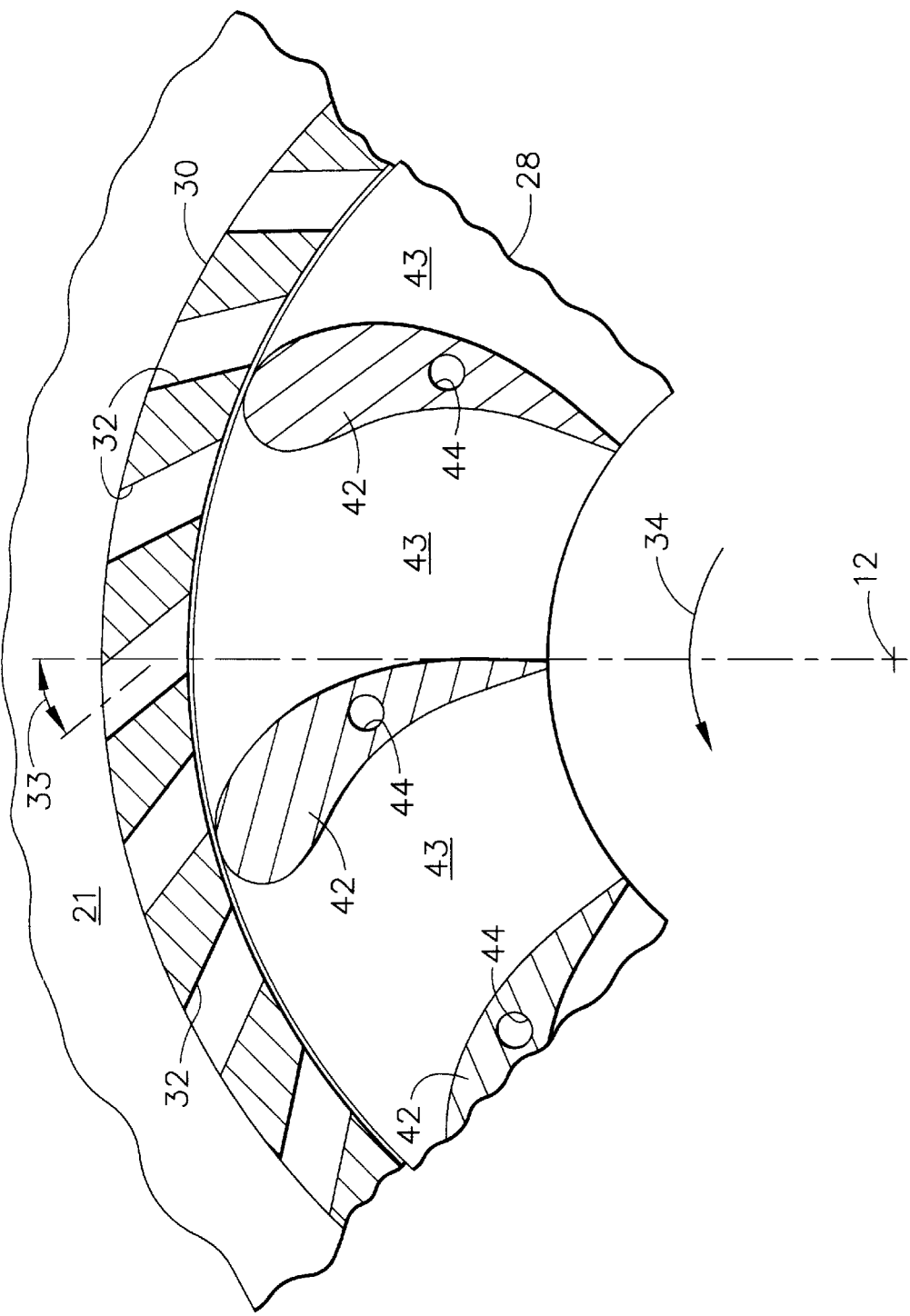
FIG. 3 is a partial elevational cross section as viewed along line 3—3 of FIG. 1.

As clearly depicted in FIGS. 1–3, annular rotary member 22, which constitutes a portion of the torque transmitting shafting for the compressor section, includes an axially extending cylindrical wall or flange 30, and a radially inwardly extending wall 28 arranged perpendicular to axis 12. A plurality of straight, uniform diameter pickup holes 32 pass radially inwardly through axial wall 30. Pickup holes 32 are uniformly circumferentially spaced about the annular cylindrical wall 30 and, importantly, are inclined oppositely or reversely to the direction of rotation 34 of the compressor section and associated shafting. In the arrangement illustrated the preselected angle of inclination of holes 32, represented by numeral 33, is approximately 45 degrees from a purely direct radial direction. Rotating pickup holes 32 thus receive pressurized, substantially non-swirling cooling airflow from collector 21 and direct it on to the path radially inwardly through the pickup holes 32 with minimal air loss to the cooling airflow. Of course, in traversing the rotating holes 32, swirl is induced into the cooling airflow, but the angle of inclination 33 of holes 32 minimizes swirl increase and allows the airflow to traverse the torque transmitting path with only a very small loss in static pressure.

A vortex spoiler 24 is rigidly intersecured to rotary member 22 for rotation therewith by a plurality of bolts 26 passing axially through opening 36 in radial wall 28 of member 22, and an aligned opening 44 in a radial wall 38 of vortex spoiler 24. The radial walls 28, 38 define a radially inwardly extending path from pickup holes 32 to the desired radial inner location adjacent shaft 13. Vortex spoiler 24 further includes an axial flange 40 extending axially into contact with the compressor 18.

Vortex spoiler 24 further includes a plurality of circumferential spaced blades 42 which are smoothly curved oppositely or reversely to the direction 34 of rotation of the shafting. The blades 42 extend axially between radial walls 28 and 38 to divide the path or space there between into a plurality of minimally converging passages 43. The radially outer end of each of the blades 42 is inclined in matching relationship to the preselected angle 33 of the pickup holes 32. Blades then smoothly turn to the point where the radially inner end of each of the blades 42 is substantially directly radially direction. Preferably, the blades 42 are constructed with a camber line following a circular arc. The blades 42 are configured such that the radial inner ends of passages 43 are as large as possible. More particularly, the entirety of passages 43 are maintained at as substantially a large a cross section as reasonably possible to avoid convergence and attendant velocity increase and pressure drop of the cooling airflow in traversing passages 43. As evident from the drawings, the bolt openings 44 in the vortex spoiler 24 extend axially through the blades 42.

While radially inwardly traversing the passages 43, the blades 42 operate to prevent increase in swirl in the cooling airflow even though the airflow passes through a relatively long, radially inwardly extending length to the exit of the passages 43. Virtually zero increase in swirl in the cooling airflow occurs as it radially inwardly traverses the entire length of passages 43. As a result, the cooling airflow exits the passages 43 with very minimal static pressure loss. As noted, after exiting passages 43 the cooling airflow may then be delivered axially such as through the central bore 18b of the centrifugal compressor 18 while maintaining a static pressure significantly greater than without incorporation of the vortex spoiler.

The improvement in preservation of static pressure of the cooling airflow afforded by the present invention is significant. While the percentage of preservation of static pressure varies proportionately with total mass flow of the bleed air, i.e., a larger total mass flow would result in a proportionately larger preservation of static pressure, analyses have shown that the present invention can readily preserve up to 70 percent of static pressure of the cooling airflow while directing it radially inwardly to a significantly smaller radius. In comparison, analyses show that under the same conditions without use of the present invention would preserve only about 30 percent of the static pressure of the cooling airflow would be preserved without use of its present invention.

Accordingly, the present invention provides an improved cooling airflow pickup and delivery scheme particularly useful in gas turbine engines wherein the torque transmitting path to the compressor section of the engine is at a relatively large radius, significantly larger than the radius of the location to where the cooling airflow must be delivered.

Various modifications and alterations to the foregoing detailed description of preferred arrangements of the invention will be apparent to those skilled in the art. For example, the vortex spoiler 24 and rotary member 22 may be integrally constructed as a single component. Accordingly, the foregoing should be considered as exemplary and not as limiting to the scope and spirit of the invention as set forth in the appended claims.

Having described the invention with sufficient clarity that those skilled in the art may make and use it, what is claimed is:

1. In a gas turbine engine having a compressor assembly that includes a plurality of rotary compressor stages interconnected in torque transmitting relationship by rotary shafting such that the torque transmittal path between the compressor stages is disposed substantially radially outward of the axis of rotation of the compressor stages, a cooling airflow pickup system comprising:

a collector arranged to collect pressurized, substantially nonswirling, cooling airflow from said compressor assembly at a first location radially outward of said shafting;

an annular rotary member in said shafting having a plurality of straight, radially inwardly extending pickup holes arranged to receive the nonswirling airflow from said collector means, said pickup holes being circumferentially spaced about said annular member and being inclined reversely to the direction of rotation of said shafting at a preselected angle to a direct radial direction, such that the cooling airflow may pass radially inwardly through said pickup holes with minimal static pressure loss; and a vortex spoiler interconnected to rotate with said shafting, said spoiler defining a path extending radially inwardly from said pickup holes to a second location substantially closer to the axis of rotation than said first location, said spoiler including a plurality of circumferentially spaced blades smoothly curved reversely to the direction of rotation of said shafting and axially spanning said path to divide it into a plurality of minimally converging passages, the radially outer end of each of said blades being inclined in matching relation to said preselected angle of the pickup holes, and the radially inner end of each of said blades being in a substantially directly radial direction, such that cooling airflow may pass radially inwardly through said passages to said second location with minimal swirl increase and minimal static pressure loss.

2. In a gas turbine engine as set forth in claim 1, wherein at least one of said compressor stages comprises a unitary disc with a plurality of radially outwardly extending compressor blades integrally formed with said disc.

3. In a gas turbine engine as set forth in claim 2, wherein said compressor assembly further includes sets of stationary, deswirling diffuser vanes interspersed between said compressor stages, said collector arranged to receive to airflow from said compressor assembly as it discharges from a set of said stationary vanes.

4. In a gas turbine engine as set forth in claim 1, wherein said rotary member includes an axially extending cylindrical wall and a radial wall extending inwardly substantially perpendicularly to said axis of rotation to define a radial wall of said path, said pickup holes being disposed in said axially extending cylindrical wall.

5. In a gas turbine engine as set forth in claim 4, wherein said vortex spoiler includes a radial wall extending inwardly perpendicularly to said axis of rotation to define another radial wall of said path, said blades being integrally attached to said radial wall of the spoiler and extending axially across said path to said radial wall of the rotary member.

6. In a gas turbine engine as set forth in claim 5, wherein said spoiler further includes a plurality of bolts passing axially through said blades for firmly intersecuring said radial walls of the rotary member and spoiler.

7. In a gas turbine engine as set forth in claim 1, wherein said preselected angle is approximately 45 degrees.

8. In a gas turbine engine as set forth in claim 7, wherein the camber line of each of said blades is a circular arc.

9. A gas turbine engine, comprising:

a compressor assembly including a plurality of rotary compressor stages;

rotary shafting interconnecting said compressor stages in torque transmitting relationship such that the torque transmittal path between the compressor stages is disposed substantially radially outward of the axis of rotation of the compressor stages;

a collector arranged to collect pressurized, substantially nonswirling, cooling airflow from said compressor assembly at a first location radially outward of said shafting;

an annular rotary member in said shafting having a plurality of straight, radially inwardly extending pickup holes arranged to receive the nonswirling airflow from said collector means, said pickup holes being circumferentially spaced about said annular member and being inclined reversely to the direction of rotation of said shafting at a preselected angle to a direct radial direction; and a vortex spoiler interconnected to rotate with said shafting, said spoiler defining a path extending radially inwardly from said pickup holes to a second location substantially closer to the axis of rotation than said first location, said spoiler including a plurality of circumferentially spaced blades smoothly curved reversely to the direction of rotation of said shafting and axially spanning said path to divide it into a plurality of minimally converging passages, the radially outer end of each of said blades being inclined in matching relation to said preselected angle of the pickup holes, and the radially inner end of each of said blades being in a substantially directly radial direction.

10. In a gas turbine engine as set forth in claim 9 wherein at least one of said compressor stages comprises a unitary disc with a plurality of radially outwardly extending compressor blades integrally formed with said disc.

11. In a gas turbine engine as set forth in claim 9, wherein said compressor assembly further includes sets of stationary, deswirling diffuser vanes interspersed between said compressor stages, said collector arranged to receive to airflow from said compressor assembly as it discharges from a set of said stationary vanes.

12. In a gas turbine engine as set forth in claim 9, wherein said rotary member includes an axially extending cylindrical wall and a radial wall extending inwardly substantially perpendicular to said axis of rotation to define a radial wall of said path, said pickup holes being disposed in said axially extending cylindrical wall.

13. In a gas turbine engine as set forth in claim 12, wherein said vortex spoiler includes a radial wall extending inwardly perpendicularly to said axis of rotation to define another radial wall of said path, said blades being integrally attached to said radial wall of the spoiler and extending axially across said path to said radial wall of the rotary member.

14. In a gas turbine engine as set forth in claim 9, wherein said preselected angle is approximately 45 degrees.

15. In a gas turbine engine as set forth in claim 14, wherein the camber line of each of said blades is a circular arc.

* * * * *